(12) United States Patent
Schuster

(10) Patent No.: US 6,533,220 B2
(45) Date of Patent: Mar. 18, 2003

(54) DEVICE FOR ATTACHING A LOAD TO A HELICOPTER

(75) Inventor: Matthias Schuster, Ludwigsburg (DE)

(73) Assignee: ecms Aviation Systems GmbH (DE)

( * ) Notice: Subject to any disclaimer, the term of this patent is extended or adjusted under 35 U.S.C. 154(b) by 0 days.

(21) Appl. No.: 10/127,206

(22) Filed: Apr. 22, 2002

(65) Prior Publication Data

US 2002/0171008 A1 Nov. 21, 2002

Related U.S. Application Data

(63) Continuation of application No. PCT/EP00/09987, filed on Oct. 11, 2000.

(30) Foreign Application Priority Data

Oct. 20, 1999 (DE) .......................... 199 50 405

(51) Int. Cl.⁷ .............................. B64C 1/22; B64D 9/00
(52) U.S. Cl. .................... 244/118.1; 244/137.4
(58) Field of Search .................... 244/137.4, 137.1, 244/118.1, 127; 294/82.26, 81 S

(56) References Cited

U.S. PATENT DOCUMENTS

| 2,953,330 A | * | 9/1960 | Lysak ...................... 244/118.1 |
|---|---|---|---|
| 3,248,074 A | * | 4/1966 | Cannon .................... 244/137.4 |
| 3,690,602 A | * | 9/1972 | Marsh ...................... 244/137.4 |
| 3,743,107 A | * | 7/1973 | Verschoof |
| 3,904,156 A | * | 9/1975 | Smith ....................... 244/118.1 |
| 3,946,971 A | * | 3/1976 | Chadwick ................ 244/137.4 |
| 4,378,919 A | * | 4/1983 | Smith ....................... 244/118.1 |
| 5,761,757 A | | 6/1998 | Mitchell et al. .............. 14/71.5 |
| 6,192,990 B1 | * | 2/2001 | Brooke |

FOREIGN PATENT DOCUMENTS

| DE | 691 01 704 | | 11/1994 | |
|---|---|---|---|---|
| DE | 19500375 A1 | * | 11/1996 | ............. 244/137.4 |
| DE | 195 22 564 | | 8/1997 | |
| DE | 199 50 405 | | 11/2001 | |

* cited by examiner

Primary Examiner—Michael J. Carone
Assistant Examiner—Lulit Semunegus
(74) Attorney, Agent, or Firm—St. Onge Steward Johnston & Reens, LLC

(57) ABSTRACT

A device for hanging a load on a helicopter has at least one load-bearing cable which has a first cable section, which is off-center in relation to a longitudinal axis of the helicopter, and a second off-center cable section located opposite. The load-bearing cable is connected to the helicopter, on the one hand, and to the load, on the other hand. Ends and of the load-bearing cable are fixedly attached to the helicopter, and the load-bearing cable is connected to the load in a manner in which it can be moved relative to the latter, such that the load can be displaced along the load-bearing cable.

21 Claims, 3 Drawing Sheets

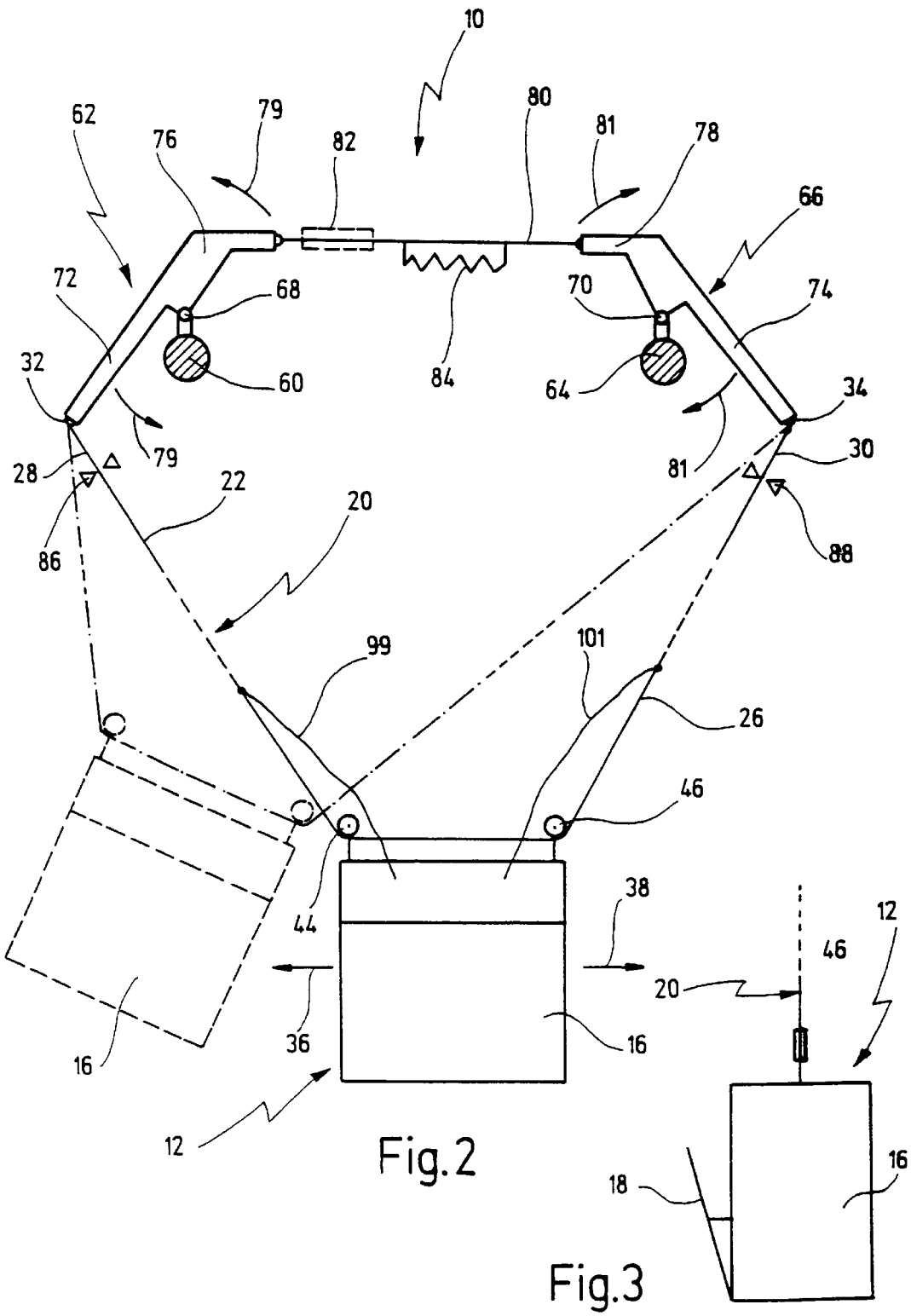

DEVICE FOR ATTACHING A LOAD TO A HELICOPTER

CROSS-REFERENCE TO PENDING APPLICATION

This application is a continuation of pending international patent application PCT/EP00/09987 filed on Oct. 11, 2000 which designates the United States, and which claims priority of German patent application 199 50 405.9 filed on Oct. 20, 1999.

BACKGROUND OF THE INVENTION

The invention relates to a device for hanging a load on a helicopter, having at least one load-bearing cable which has a first cable section, which is off-center in relation to a longitudinal axis of the helicopter, and a second off-center cable section located opposite, the load-bearing cable being connected to the helicopter, on the one hand, and to the load, on the other hand.

Such a device is known from DE 196 23 562 A1. A further device of this type is known from DE 195 22 564 C2.

A device of the type mentioned at the outset generally serves for transporting a load hanging on a helicopter.

Within the context of the present invention, loads may be, for example, goods or baskets in which people are carried.

A specific application of such a device is that of transporting workers in a basket to overhead power transmission lines on which installation work or repairs have to be carried out or on which aviation signal balls are to be fitted. In the case of such overhead transmission-line work, the helicopter brings the basket with the workers to beneath the overhead transmission line and then raises the basket, a laterally projecting fork being arranged on the basket, with the result that the basket grips beneath the overhead transmission line by way of the fork. The helicopter then raises the basket until the basket is secured on the overhead transmission line with a certain amount of tensile stressing.

Examples of other possible uses of such a device are for transporting people to cooling towers, television towers, etc, in order to carry out work thereon, or using the arrangement for rescue purposes, for example in the event of fires in high-rise buildings, in the case of which a basket for carrying people has to be positioned in front of windows or balconies or on the building roof.

While the following description describes the invention in an application for overhead transmission-line work, it goes without saying that the present invention is nevertheless not restricted to this application. Such an arrangement may be used, in principle, for transporting loads, by means of a helicopter, to locations which can only be reached from the air or can be reached from the air more easily than from the ground.

A general problem with transporting hanging loads by helicopter is that the load tends to swing and rotate. In particular swinging of the load beneath the helicopter in the direction transverse to the longitudinal axis of the latter constantly changes the position of the center of gravity of the overall helicopter/load arrangement, which may result in critical flying situations. The helicopter pilot then has to compensate for such changes in the center of gravity.

In order to avoid swinging in the direction transverse to the longitudinal axis of the helicopter, DE 691 01 704 T2 describes a device which is intended for hanging a load on a helicopter and has two off-center load-bearing cables, the two load-bearing cables being fixedly attached to the helicopter by one end and to the load by the other end. Rotation of the load about the vertical axis is thus largely avoided. The tendency of the load to swing in the direction transverse to the longitudinal axis is also reduced in this way.

Since it is nevertheless the case that swinging of the load suspended on load-bearing cables cannot be prevented completely, this known device, having two separate lateral load-bearing cables, results, in the case of the load swinging in the direction transverse to the longitudinal axis, in load-changing forces acting abruptly on the helicopter because, as the load swings, one of the lateral load-bearing cables is essentially relieved of stressing, while the other load-bearing cable is abruptly subjected to stressing. Such abrupt changes in tensile force, however, may result in dangerous flying situations for the helicopter.

In order to avoid this, DE 196 23 562 A1 and DE 195 22 564 C2 have proposed a device of the type mentioned at the outset which has a crossmember which is fastened on the helicopter and extends transversely to the longitudinal axis of the helicopter. The crossmember has outer deflecting rollers, the load-bearing cable being guided over the deflecting rollers. The load-bearing cable has its free ends fixedly attached directly or indirectly to the load. Starting from the end attached to the load, the load-bearing cable thus runs by way of a first cable section, off-centrally in relation to the longitudinal axis of the helicopter, to the first deflecting roller on the crossmember, horizontally from there to the opposite, second deflecting roller of the crossmember and, from there, the second cable section then leads, once again off-centrally in relation to the longitudinal axis, back to the load, where the other end of the load-bearing cable is fixedly attached to the load.

The load-bearing cable can thus be moved relative to the crossmember and, accordingly, can be displaced along the crossmember relative to the helicopter.

Since, instead of two separate lateral load-bearing cables, one continuous load-bearing cable is used, abrupt changes in load force are avoided in the case of the load swinging.

However, this known arrangement is disadvantageous because the load-bearing cable can be displaced relative to the helicopter at the helicopter end. This is because it is not possible, by straightforward design means, for the load force acting on the load-bearing cable to be picked up from the load-bearing cable itself since, on account of the mobility of the load-bearing cable in the region of the helicopter, a corresponding load-measuring device cannot be integrated there. If a strain gauge were integrated in the load-bearing cable in the region of the crossmember, it would be constantly moving as well, as would the electric cabling by means of which such a force-measuring device is connected to display devices in the cockpit. Since, furthermore, for safety reasons, such a load-bearing cable has to be capable of being cut, for which purpose, in the case of the known device, at least one cutting device is provided on the load-bearing cable in the region of the crossmember, this would further mean, in the case of the load-bearing cable being cut, that the force-measuring device would be lost or damaged. In order to allow load-force measurement, it is thus provided, in the case of the known device, to suspend the crossmember itself on the helicopter by means of cables and to pick up the load force from these cables, although this is associated with increased outlay.

A further disadvantage of the known device is the crossmember itself, which, on account of its projecting dimensions, makes the installation of the device more difficult and, moreover, has a high dead weight, which results in the load which can be raised by the helicopter being reduced.

The object of the invention is thus to improve further a device of the type mentioned at the outset.

SUMMARY OF THE INVENTION

According to the invention, this object is achieved, in respect of the device mentioned at the outset, in that ends of the load-bearing cable are fixedly attached to the helicopter, and in that the load-bearing cable is connected to the load in a manner in which it can be moved relative to the latter, such that the load can be displaced along the load-bearing cable.

In contrast to the known device, the load-bearing cable in the case of the device according to the invention is not itself of continuous design; rather, its ends, at the helicopter end, are fixedly attached to said helicopter. In contrast, the load-bearing cable is connected to the load such that the load can be displaced freely along the load-bearing cable, with the result that, in the case of the load swinging, abrupt changes in load force, which may adversely affect the flying stability of the helicopter, are avoided because both cable sections of the load-bearing cable are always kept under stressing. Since the load-bearing cable, however, is not itself of continuous configuration, this advantageously makes it possible for a load-force measurement to be provided directly or indirectly on the load-bearing cable. On account of the possibility of picking up the load force from the load-bearing cable itself, the technical outlay is thus reduced in relation to the known device. The tendency of the load to swing in the direction transverse to the longitudinal axis and to rotate about the vertical axis is likewise reduced by the device according to the invention. Even in the case of the device being used for work on overhead power transmission lines, the ability of the load to move freely relative to the load-bearing cable allows the helicopter to be displaced laterally to the load or a basket to be secured in an oblique position on an overhead transmission line. In the case of this application, a further advantage of the arrangement according to the invention in relation to the known device, with the load-bearing cable which can move round continuously on the crossmember, is that, before the basket is docked on the overhead transmission line, the workers can displace the basket laterally into a suitable position, or position it obliquely, on the load-bearing cable, with the result that the operation of docking on the overhead transmission line is simplified to a considerable extent.

In a preferred configuration, the load-bearing cable is connected to the load in a manner in which it is guided around at least one deflecting means at the load end.

This measure has the advantage that the ability of the load to move relative to the load-bearing cable can be achieved by straightforward means.

It is furthermore preferred here if the load-bearing cable is guided, at the load end, by at least one deflecting roller which is attached to the load.

Such a deflection roller advantageously enables the load to move smoothly relative to the load-bearing cable, with the result that, during flight, the load can always move back freely, with low frictional resistance, into its central, lowermost position, in which the center of gravity of the load is located centrally beneath the helicopter.

It is furthermore preferred here if the deflecting roller is fitted in loss-proof fashion on the load-bearing cable and can be fastened in a removable manner on the load.

This measure has the advantage that the load-bearing cable can be fastened on the load with very low installation outlay, and there is no need for the deflection roller to be pre-assembled on the load-bearing cable. Such a deflecting roller may have, for example, a bracket, the load-bearing cable being guided through between the guide groove of the roller and the bracket, and the bracket being provided, for example, with a shackle, by means of which the deflection roller can be shackled to the load.

In a further preferred configuration, the first cable section and/or the second cable section are/is in operative connection, at the helicopter end, with a stationary force-measuring device in order to measure a tensile load acting on the load-bearing cable.

As has already been mentioned, the configuration of the device according to the invention advantageously makes it possible to provide a force-measuring device which can measure the tensile load acting on the load-bearing cable because, in contrast to the known device, the load-bearing cable, rather than being of continuous configuration, is fixed relative to the helicopter. It is advantageously possible here for the load-bearing cable to be connected directly or indirectly to the force-measuring device by way of the first cable section and/or the second cable section, depending on whatever proves to be more expedient.

In a particularly preferred configuration, the first cable section is attached to an outer lever arm of a first two-armed lever and the second cable section is attached to an outer lever arm of the second two-armed lever, the levers each being fastened on the helicopter such that they can be pivoted about a pivot axis running approximately parallel to the longitudinal axis of the helicopter, and inner lever arms of the levers being connected to one another by a tie element.

This configuration of the device according to the invention, then, is advantageous, in particular in conjunction with the provision of a force-measuring device for measuring the tensile load acting on the load-bearing cable, since the tensile force of the cable sections which acts on the outer lever arms of the levers is converted into tensile stressing of the tie element by the inner lever arms of the levers, it then being possible for the tensile stressing of the further tie element to be measured, from which it is possible to measure the load force or tensile force acting on the arrangement and thus on the helicopter. The further advantage of this configuration is that the arrangement comprising the two levers and the tie element may be permanently installed on the helicopter, in particular together with a force-measuring device, while the load-bearing cable may have its free ends attached to the levers, for example by means of a shackle connection. A yet further advantage of this configuration is that the arrangement comprising the two levers and the further cable may be configured to be of considerably lower weight than the crossmember of the known device. The tie element used may be a rod, a telescopic rod or also a cable.

It is furthermore preferred here if the first lever and the second lever are arranged opposite one another on the landing frame of the helicopter.

In this way, the outer lever arms, on which the first cable section and the second cable section act, are arranged as low as possible and as far apart from one another as possible on the helicopter, as a result of which swinging and rotating of the load are reduced yet further.

In a further preferred configuration, in the loaded state, the outer lever arms project downward beyond the skids of the helicopter by way of their free end, to which the respective first and second cable sections are attached.

The advantageous effect of this measure is that the load force acts at an even lower level on the helicopter, this further improving the flying stability of the helicopter with load suspended.

In a further preferred configuration, the outer lever arms project laterally outward beyond the skids of the helicopter.

This measure further reduces the tendency of the load to rotate about the vertical axis and/or to swing in the direction transverse to the longitudinal axis.

In a further preferred configuration, ends of the inner lever arms of the two levers to which the tie element is attached are positioned in relation to the respective pivot axis such that, in the loaded state, the inner lever arms are subjected to loading in opposite pivoting directions.

It is thus advantageously always ensured that the load force acting on the levers subjects the two levers to a torque in opposite directions, with the result that the tie element between the inner lever arms is always kept under tensile stressing, so that a force measurement can take place thereon. This is realized, for example, by the ends being arranged within and above the pivot axes.

In a further preferred configuration, ends of the outer lever arms to which the ends of the load-bearing cable are attached are at a lower level than the pivot axes of the levers.

This has the advantage that, in the case of the load being displaced laterally in relation to the longitudinal axis of the helicopter, it is always ensured that the levers do not swing over into the opposite direction of rotation because the situation where the force direction of the load passes through the pivot axis is avoided.

It is particularly advantageous if the force-measuring device measures the tensile stressing of the tie element.

By measuring the tensile stressing of the tie element, which is subjected to tensile stressing in the case of a hanging load, it is possible for the load force acting on the load-bearing cable to be measured and displayed on a display device in the helicopter cockpit. Since the length of the lever arms of the two levers is known, the tensile force acting on the load-bearing cable can be gathered from the tensile stressing of the tie element by a straightforward conversion, which can take place electronically.

In a further preferred configuration, the tie element is a cable.

This measure has the advantage that using a cable as the tie element between the inner lever arms of the levers results in a configuration of the device according to the invention which, on the one hand, is of low weight and, on the other hand, is cost-effective.

In a further preferred configuration, in the load-free state, the levers are preloaded into a position in which the outer lever arms and the inner lever arms do not project downward beyond the skids of the helicopter.

It is further advantageous here, then, that, in the case of the outer lever arms projecting downward beyond the skids in the loaded state, it is possible, without uncoupling the load from the outer lever arms, for the helicopter to land on the ground, behind the deposited load, without the two levers coming into contact with the ground in the process. Since the load need not be uncoupled, this saves time and work between two service flights.

It is preferable here if the levers are subjected to spring force.

For this purpose, it is possible, for example in the case where the tie element is a cable, for the cable to be connected to a tension spring, with the result that, in the load-free state of the levers, the tension spring contracts the cable and thus shortens the distance between the inner lever arms. Provision may also be made, however, for the two levers to be preloaded at their pivot axes, for example by means of a torsion spring.

As an alternative to the configuration of the arrangement with the two levers, it is also preferred if the first cable section and/or the second cable section are/is guided over a deflecting means in the region of the landing frame of the helicopter and act/acts directly on the force-measuring device.

In this case, the force-measuring device may be fastened, for example, centrally beneath the fuselage of the helicopter, in which case the cable sections are guided over the deflecting means to the force-measuring device and act on the latter. In this case, the force-measuring device may be, for example, a load cell, by means of which the tensile forces can be measured. This configuration also has the advantage of being of particularly low weight.

In a further preferred configuration, at least one cutting device for cutting the load-bearing cable is arranged on the first cable section and on the second cable section, in the region where they are fastened on the helicopter.

Since it has to be possible for hanging loads transported on a helicopter to be jettisoned in the event of emergency, it is advantageous to provide a cutting device on the two cable sections in the region where they are fastened on the helicopter. In contrast, the tie element, which, in the case of the configuration of the device with the two levers, runs between the inner lever arms, does not require any cutting device, with the result that, as has already been mentioned, it is also the case that a force-measuring device on the tie element is not lost, or it does not obstruct the jettisoning of the load, in the case of the load-bearing cable being cut. In order to allow the cutting to take place on both sides simultaneously and redundantly, it is advantageous to provide two independent cutting devices for each cable section, in order to compensate for small time differences in the triggering operation. The cutting devices may be triggered electrically or pyrotechnically. If two cutting devices are provided for each cable section, it is highly probable that the situation where problems on one side arise if one cutting device fails and the load-bearing cable, during the severing operation, has to thread out through the deflecting rollers at the load end is avoided.

In conjunction with the cutting devices, it is furthermore preferred if the outer lever arms are of tubular design, if the first cable section and the second cable section have their respective end introduced into the outer lever arms, and if the cutting devices are integrated in the outer lever arms.

This configuration provides an advantageous method of attaching the ends of the load-bearing cable to the outer lever arms by said ends being guided, for example, into the tubular levers, it being possible to arrange at the ends of the load-bearing cable in each case an eyelet which is retained by a transverse bolt through the respective lever arm. The at least one cutting device in each case may then be integrated, for example in the form of an explosive chisel, in the outer lever arms.

It is preferred here if the cutting devices can be triggered simultaneously.

This advantageously achieves the situation where, in the case of the load-bearing cable being cut, the load is not displaced off-centrally, which could adversely affect the flying stability of the helicopter.

In a further preferred configuration, there are provided two load-bearing cables which are spaced apart from one another in the longitudinal direction of the helicopter and are connected, independently of one another, to the helicopter and to the load.

Accordingly, it is possible to provide the device according to the invention with two load-bearing cables in one or more of the previously mentioned configurations on the helicopter in order to hang the load on the helicopter. Two load-bearing cables according to the previously mentioned configurations also achieve the redundancy for suspending the load, said redundancy being required for safety reasons. Of course, it is also possible for the device according to the invention to be equipped with just one load-bearing cable in one of the previously mentioned configurations, and a second load-bearing cable arranged centrally beneath the helicopter may be provided for securing the load.

Furthermore, it is preferred if a pulling line is fitted on the first cable section and/or on the second cable section.

In the case where the load suspended is a basket for carrying people, this has the advantage that, by pulling on the pulling line, it is easily possible for the load to be pulled into an off-center position relative to the load-bearing cable, for example in order to move the basket into a position which is favorable for docking on an overhead power transmission line.

Further advantages can be gathered from the following description and from the attached drawing.

It goes without saying that the features which have been mentioned above and those which are still to be explained hereinbelow can be used not just in the combination specified in each case, but also in other combinations or on their own, without departing from the scope of the present invention.

BRIEF DESCRIPTION OF THE DRAWING

Exemplary embodiments of the invention are explained in more detail in the following description and are illustrated in the drawing, in which:

FIG. 2 shows a front view of the device from FIG. 1 on its own with further details;

FIG. 3 shows a basket for use with the device when the device is used for overhead transmission-line work;

DETAILED DESCRIPTION OF PREFERRED EMBODIMENTS

Figure 1:
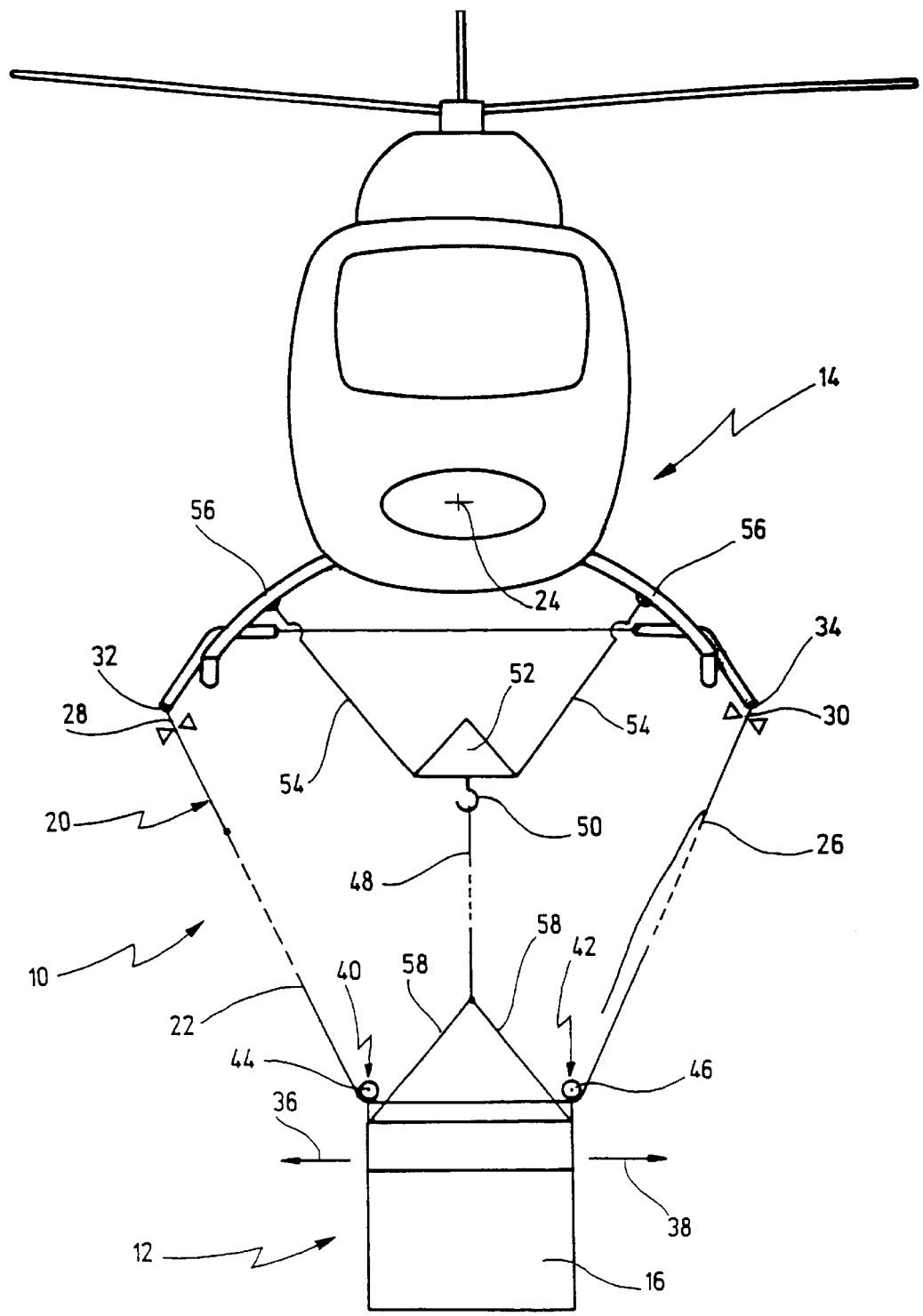
FIG. 1 shows a schematic illustration of a front view of a device for hanging a load on a helicopter.

FIGS. 1 and 2 illustrate a device, which is provided with the general reference numeral 10, for hanging a load 12 on a helicopter 14.

In the exemplary embodiment shown, the load 12 is a basket 16 for carrying people.

Workers, for example, are transported in the basket 16 for carrying out work on overhead power transmission lines. In this case, the basket 16 has a fork 18 which projects laterally from the rest of the basket 16.

The helicopter 14 can fly the basket 16, with the workers standing therein, to an overhead transmission line, the helicopter 14 then moving beneath the overhead transmission line by way of the fork 18 of the basket 16 and, by raising the basket 16 further, securing the same on the overhead transmission line. The helicopter 14 then hovers and secures the basket 16 under tensile stressing on the overhead transmission line, the basket 16 being held in position on the overhead transmission line by the fork 18.

The device 10 has a load-bearing cable 20. The load-bearing cable 20 may be, for example, a thin multi-core steel cable, a plastic cable or a textile cable, possibly with reinforcements.

The load-bearing cable 20 is designed in one piece overall. This may be realized, as in the exemplary embodiment illustrated, by a single load-bearing cable 20. It is also possible, however, for removing the load more easily, for better dismantling of the device 10 or varying the distance between the helicopter 14 and the load 12, for the load-bearing cable 20 to comprise a plurality of cables connected one behind the other.

The load-bearing cable 20 has a first cable section 22, which runs off-centrally in relation to a longitudinal axis 24 of the helicopter 14.

The load-bearing cable 20 also has a second cable section 26, which is arranged opposite the first cable section 22 of the load-bearing cable 20, on the other side of the longitudinal axis 24.

The first cable section 22 and the second cable section 26 together define a plane which runs transversely to the longitudinal axis 24.

The first cable section 22 and the second cable section 26 are connected as one piece integrally to one another in the region of the load 12.

The load-bearing cable 20 has a first end 28 and a second end 30. The ends 28 and 30 of the load-bearing cable 20 are fixedly attached to the helicopter, to be precise the first end 28 of the load-bearing cable 20 is fixedly attached at a first fastening point 32 and the second end 30 is fixedly attached to a second fastening point 34, as is described in more detail hereinbelow.

The load-bearing cable 20 is connected to the load 12, in contrast, in a manner in which it can be moved relative to the load 12, with the result that the load 12 can be displaced along the load-bearing cable, as is indicated by arrows 36 and 38 and as is illustrated in FIG. 2 by dashed lines.

At the load end, the load-bearing cable 20 is guided around two deflecting means 40 and 42. The deflecting means 40 and 42 are formed by deflecting rollers 44 and 46 which are each attached to the load 12.

The deflecting rollers 44 and 46 here are fitted in loss-proof fashion on the load-bearing cable 20 and are fastened in a removable manner on the load 12. The deflecting rollers 44 and 46 may be configured in each case as a roller block in the case of which the guide roller has a bracket passing over it, with the result that the load-bearing cable 20 is guided between the guide roller and bracket. Fitted on the bracket, for example, is a shackle, by means of which the deflecting rollers 44 and 46 can then be shackled to the load 12.

In order to achieve redundancy for the suspension of the load 12, FIG. 1 also illustrates an additional load-bearing cable 48, which is arranged centrally beneath the helicopter 14 in relation to the longitudinal axis 24 and is attached to a load hook 50. The load hook 50 is arranged on a pyramid-shaped element 52 which is suspended on the helicopter 14, in this case on brackets 56 of the helicopter landing frame, via cables 54. The load-bearing cable 48 is fixedly connected to the load 12 via further load-bearing cables 58.

Suspending the load 12 on the additional load-bearing cable 48 and the load-bearing cables 58 serves merely as a redundant safeguard for suspending the load 12 on the load-bearing cable 20, with the result that, when the load-bearing cable 20 is intact, the load-bearing cable 48 is relieved of stressing, i.e. does not perform any load-bearing function. Even with the safeguard by way of the load-bearing cable 48, the load 12 remains displaceable relative to the load-bearing cable 20, since the load-bearing cable 48 is only attached at one point, namely to the load hook 50.

The fastening of the load-bearing cable 20 on the helicopter 14 is described in more detail hereinbelow.

For this purpose, a first two-armed lever 62 is fastened on a right-hand skid 60, and a second two-armed lever 66 is fastened on a left-hand skid 64, of the helicopter 14. The first lever 62 and the second lever 66 here are located opposite one another on the same axial level.

The first lever 62 is fastened on the skid 60 such that it can be pivoted about a first pivot axis 68, which runs approximately parallel to the longitudinal axis 24 of the helicopter 14. The second two-armed lever 66 is likewise fastened on the skid 64 such that it can be pivoted about a second pivot axis 70, which likewise runs approximately parallel to the longitudinal axis 24 of the helicopter 14.

The fastening point 32 of the first end 28 of the load-bearing cable 20 is located at a free end of an outer lever arm 72 of the first lever 62, while the second fastening point 34 of the second end 30 of the load-bearing cable 20 is located at a free end of an outer lever arm 74 of the second lever 66. In this case, the end of the outer lever arm 72 and the end of the outer lever arm 74 are at a lower level then the associated pivot axes 68 and 70.

The first lever 62, furthermore, has an inner lever arm 76, while the second lever 66 likewise has an inner lever arm 78.

The outer lever arm 72 and the inner lever arm 76 of the first lever 62 are rigidly connected, for example, in one piece integrally to one another, and the outer lever arm 74 is likewise rigidly connected to the inner lever arm 78.

In the loaded state, the outer lever arms 72 and 74 of the first lever 62 and second lever 66 respectively project both downward and laterally outward beyond the respective skid 60, 64.

In the exemplary embodiment shown, the outer lever arms 72 and 74 form an angle of approximately 1300 with the respective inner lever arms 76 and 78.

The inner lever arms 76 and 78 are connected to one another via a tie element 80. The tie element 80 is designed in the form of a cable, but may also be a rod or a telescopic rod.

In the loaded state, i.e. when the load 12 hangs freely, the inner lever arms 76 and 78, in the exemplary embodiment shown, run approximately horizontally. This results from the selected way, shown in the exemplary embodiment, of shaping the levers 62 and 66. Without the levers 62, 66 being restricted to this shape, all that is required is to allow for the ends of the inner lever arms 76, 78 to which the tie element 80 is attached to be positioned in relation to the respective pivot axis 68, 70 such that, in the loaded state, the levers 62, 66 are subjected to loading in opposite pivoting directions, as is described hereinbelow.

The ends of the inner lever arms 76, 78 here are arranged above and between the pivot axes 68 and 70.

The tie element 80 may be connected to the inner lever arms 76 and 78 such that it can easily be removed.

In the loaded state, the cable sections 22 and 26 of the load-bearing cable 20 subject the respective outer levers 72 and 74 in each case to a torque which attempts to rotate the respective levers 62 and 66 about the respective pivot axes 68 and 70 in the counterclockwise direction (lever 62, arrows 79) and clockwise direction (lever 66, arrows 81), respectively. The tie element 80 here is subjected to stressing and thus counteracts the torques, with the result that, in the loaded state, the levers 62 and 66 assume the stable position shown in FIG. 2.

A force-measuring device 82, for example in the form of a strain gauge or of a load cell, is provided on the tie element 80, it being possible for this to be used for picking up the tensile force in the tie element 80 and measuring therefrom the load force or tensile force acting on the load-bearing cable 20. By means of the force-measuring device 82, it is possible for the helicopter pilot, via a corresponding display in the cockpit, to secure the basket 16 with a suitable tensile force on the overhead power transmission line and to monitor the tensile stressing without there being any danger of the helicopter pulling the basket 16 with an excessively high or low tensile force toward the overhead transmission line.

As can be gathered from FIG. 2, it is also possible for the load-bearing basket 16, on account of it being connected in a movable manner to the load-bearing cable 20, to be reliably docked in an obliquely positioned manner on an obliquely running section of an overhead transmission line, for example in the vicinity of a transmission-line mast, while the helicopter 14 is able to maintain its horizontal flying position. It is also possible, however, for the basket 16 to be offset laterally relative to the helicopter 14 without being positioned obliquely.

Provision is furthermore made in the case of the device 10, in the load-free state, for the levers 62 and 66 to be preloaded into a position in which the respective outer lever arms 72 and 74 and the respective inner lever arms 76 and 78 do not project downward beyond the skids 60 and 64 of the helicopter 14. For this purpose, the levers 62 and 66 are subjected to spring force.

Figure 4:
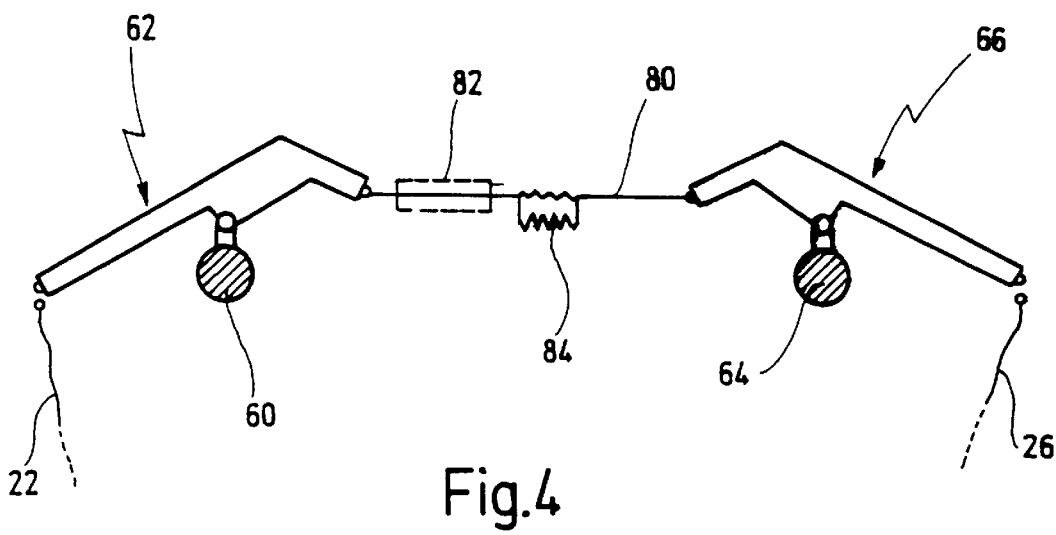
FIG. 4 shows a detail of the device from FIG. 2 in a load-free state.

For this purpose, the tie element 80, for example, is in operative connection with a spring 84 which, in the loaded state of the device 10, is subjected to stressing and, in the load-free state, shortens and pivots the levers 62 and 66 inward, as is illustrated in FIG. 4. In the case shown, where the tie element 80 is a cable, the tension spring 84 may be integrated in the cable or connected in parallel therewith. In the case where the tie element 80 is configured in the form of a telescopic rod, the telescopic rod may contain the spring 84, which shortens the telescopic rod in the non-loaded state, as a result of which it is likewise the case that, as has been described above, the levers are pivoted. It is also possible, however, for the levers 62, 66 to be preloaded at their respective pivot axis 68 and 70 by means of torsion springs.

Before the helicopter 14 lands, it is thus possible for the load 12 to be deposited first of all on the ground, the tension spring 84 being relieved of stressing and contracting and shortening the distance between the inner lever arms 76 and 78, as a result of which the outer lever arms 72 and 74 are pivoted upward, with the result that these do not come into contact with the ground when the helicopter 14 then lands on the skids 60 and 64, behind the load 12. It is thus not necessary for the load 12 to be uncoupled from the helicopter 14 for landing purposes.

Furthermore, in each case at least one cutting device 86, 88 is respectively provided both on the first cable section 22 and on the second cable section 26, it being possible for said cutting device, in the event of an emergency, to cut the load-bearing cable 20 simultaneously on both sides of the load 12, in order for it to be possible for the load 12 to be jettisoned.

In this context, the outer lever arms 72 and 74 of the levers 62 and 66 may be of tubular design. The cutting devices 86 and 88 are then integrated, for example in the form of explosive chisels, in the respective outer lever arms 72 and 74. The ends 28 and 30 of the load-bearing cable 20 are then, furthermore, provided with an eyelet which is retained by a transverse bolt through the outer lever arms 72 and 74. The cutting devices 86 and 88 then result in severing of the respective cable sections 22 and 26 in the outer lever arms 72 and 74.

Furthermore, in each case one pulling line 99, 101 is respectively fitted on the first cable section 22 and on the second cable section 26, as is indicated in FIG. 2. By pulling on the pulling line 99, it is possible for the basket 16 to be displaced relative to the load-bearing cable 20 in the direction of the arrow 36 and, by pulling on the pulling line 101, it is possible for the basket 16 to be displaced relative to the load-bearing cable 20 in the direction of the arrow 38.

Figure 5:
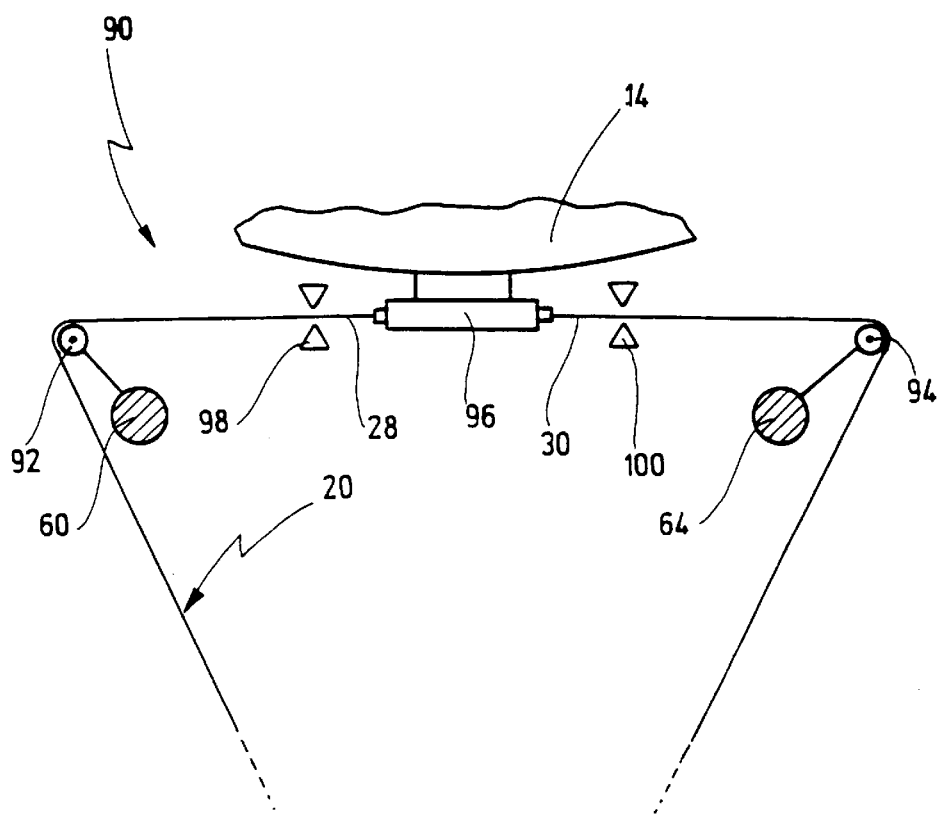
FIG. 5 shows a further exemplary embodiment of a device for hanging a load on a helicopter.

FIG. 5 illustrates yet a further exemplary embodiment of a device 90 for hanging the load 12 on the helicopter 14, this device differing from the device 10 in that the ends 28 and 30 of the load-bearing cable 20 are guided around deflecting means 92 and 94 fitted on the respective skids 60 and 64 and are attached directly to a force-measuring device 96, which is fastened on the fuselage of the helicopter 14.

The ends 28 and 30 here are guided through in each case at least one cutting device 98 and 100 which, in turn, can be triggered simultaneously.

It goes without saying that instead of the load 12 being secured by means of the load-bearing cable 48, as is illustrated in FIG. 1, it is also possible to provide a second device identical to the device 10, these devices then being provided one behind the other in the longitudinal direction of the helicopter and the load 12 then hanging on both devices. One of these two devices then serves as the redundancy safeguard for suspending the load 12.

What is claimed is:

1. A device for hanging a load on a helicopter, comprising at least one load-bearing cable having a first cable section which is off-center in relation to a longitudinal axis of said helicopter, and a second off-center cable section located opposite to said first cable section in relation to said longitudinal axis of said helicopter, wherein said load-bearing cable has two ends fixedly attached to said helicopter and said load-bearing cable is connected to said load in a manner in which it can be moved relative to said load, such that said load can be displaced along said load-bearing cable.

2. The device of claim 1, wherein said load-bearing cable is connected to said load in a manner in which it is guided around a deflecting means at the load end.

3. The device of claim 1, wherein said load-bearing cable is guided, at the load end, by at least one deflecting roller which is attached to said load.

4. The device of claim 3, wherein said deflecting roller is fitted in loss-proof fashion on said load-bearing cable and can be fastened in a removable manner on said load.

5. The device of claim 1, wherein at least one of said first cable section and said second cable section is in operative connection, at the helicopter end, with a stationary force-measuring device in order to measure a tensile load acting on said load-bearing cable.

6. The device of claim 1, wherein said first cable section is attached to an outer lever arm of a first two-armed lever and said second cable section is attached to an outer lever arm of a second two-armed lever, said levers each being fastened on said helicopter such that they can be pivoted about a pivot axis running approximately parallel to said longitudinal axis of said helicopter, wherein inner lever arms of said levers being connected to one another by a tie element.

7. The device of claim 6, wherein said first lever and said second lever are arranged opposite one another on a landing frame of said helicopter.

8. The device of claim 1, wherein said first cable section is attached to an outer lever arm of a first two-armed lever and said second cable section is attached to an outer lever arm of a second two-armed lever, said levers each being fastened on said helicopter such that they can be pivoted about a pivot axis running approximately parallel to said longitudinal axis of said helicopter, wherein inner lever arms of said levers being connected to one another by a tie element and, in the loaded state, said outer lever arms project downward beyond skids of said helicopter by way of their free end, to which said respective first and second cable sections are attached.

9. The device of claim 1, wherein said first cable section is attached to an outer lever arm of a first two-armed lever and said second cable section is attached to an outer lever arm of a second two-armed lever, said levers each being fastened on said helicopter such that they can be pivoted about a pivot axis running approximately parallel to said longitudinal axis of said helicopter, wherein inner lever arms of said levers being connected to one another by a tie element, and said outer lever arms project laterally outward beyond skids of said helicopter.

10. The device of claim 1, wherein said first cable section is attached to an outer lever arm of a first two-armed lever and said second cable section is attached to an outer lever arm of a second two-armed lever, said levers each being fastened on said helicopter such that they can be pivoted about a pivot axis running approximately parallel to said longitudinal axis of said helicopter, wherein inner lever arms of said levers being connected to one another by a tie element, and ends of said inner lever arms of said two levers to which said tie element is attached are positioned in relation to said respective pivot axis such that, in the loaded state, said inner lever arms are subjected to loading in opposite pivoting directions.

11. The device of claim 1, wherein said first cable section is attached to an outer lever arm of a first two-armed lever and said second cable section is attached to an outer lever arm of a second two-armed lever, said levers each being fastened on said helicopter such that they can be pivoted about a pivot axis running approximately parallel to said longitudinal axis of said helicopter, wherein inner lever arms of said levers being connected to one another by a tie element, and ends of said outer lever arms to which said ends of said load-bearing cable are attached are at a lower level than said pivot axes of said levers.

12. The device of claim 1, wherein at least one of said first cable section and said second cable section is in operative connection, at the helicopter end, with a stationary force-measuring device in order to measure a tensile load acting on said load-bearing cable, and said first cable section is attached to an outer lever arm of a first two-armed lever and said second cable section is attached to an outer lever arm of a second two-armed lever, said levers each being fastened on said helicopter such that they can be pivoted about a pivot axis running approximately parallel to said longitudinal axis of said helicopter, wherein inner lever arms of said levers being connected to one another by a tie element, and said force-measuring device measures the tensile stressing of said tie element.

13. The device of claim 1, wherein said first cable section is attached to an outer lever arm of a first two-armed lever and said second cable section is attached to an outer lever arm of a second two-armed lever, said levers each being fastened on said helicopter such that they can be pivoted about a pivot axis running approximately parallel to said longitudinal axis of said helicopter, wherein inner lever arms of said levers being connected to one another by a tie element, and said tie element is a cable.

14. The device of claim 1, wherein said first cable section is attached to an outer lever arm of a first two-armed lever and said second cable section is attached to an outer lever arm of a second two-armed lever, said levers each being fastened on said helicopter such that they can be pivoted about a pivot axis running approximately parallel to said longitudinal axis of said helicopter, wherein inner lever arms of said levers being connected to one another by a tie element, and, in the load-free state, said levers are preloaded into a position in which said outer lever arms and said inner lever arms do not project downward beyond skids of said helicopter.

15. The device of claim 14, wherein said levers are subjected to spring force.

16. The device of claim 1, wherein at least one of said first cable section and said second cable section is in operative connection, at the helicopter end, with a stationary force-measuring device in order to measure a tensile load acting on said load-bearing cable, and at least one of said first cable section and said second cable section is guided over a deflecting means in the region of a landing frame of said helicopter and acts directly on said force-measuring device.

17. The device of claim 1, wherein at least one cutting device for cutting said load-bearing cable is arranged on said first cable section and on said second cable section, in the region where they are fastened on said helicopter.

18. The device of claim 1, wherein said first cable section is attached to an outer lever arm of a first two-armed lever and said second cable section is attached to an outer lever arm of a second two-armed lever, said levers each being fastened on said helicopter such that they can be pivoted about a pivot axis running approximately parallel to said longitudinal axis of said helicopter, wherein inner lever arms of said levers being connected to one another by a tie element, and at least one cutting device for cutting said load-bearing cable is arranged on said first cable section and on said second cable section, in the region where they are fastened on said helicopter, and said outer lever arms are of tubular design, said first cable section and said second cable section have their respective end introduced into said outer lever arms, and said at least one cutting device is integrated in said outer lever arms.

19. The device of claim 18, wherein at least two cutting devices are provided and said cutting devices can be triggered simultaneously.

20. The device of claim 1, wherein there are provided two load-bearing cables which are spaced apart from one another in longitudinal direction of said helicopter and are connected, independently of one another, to said helicopter and to said load.

21. The device of claim 1, wherein at least one pulling line is fitted on at least one of said first cable section and said second cable section.

* * * * *